June 7, 1938.  R. S. WESTON  2,119,898
BROILER
Filed April 1, 1935  2 Sheets-Sheet 1

Inventor
Richard S. Weston

Charles B. Rasmussen
Atty.

June 7, 1938. R. S. WESTON 2,119,898
BROILER
Filed April 1, 1935 2 Sheets-Sheet 2
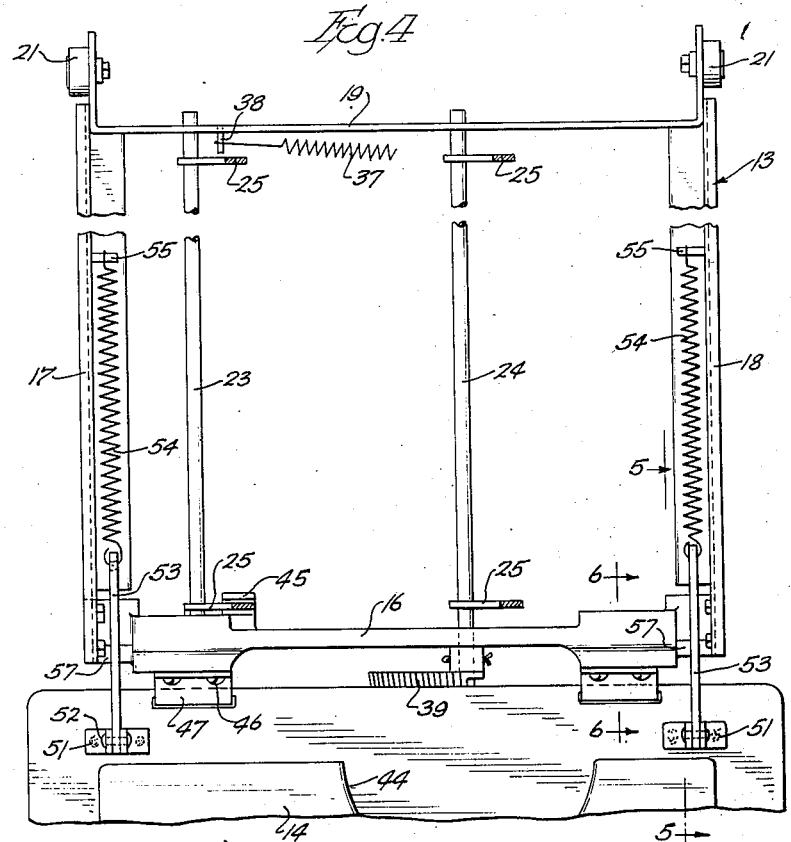
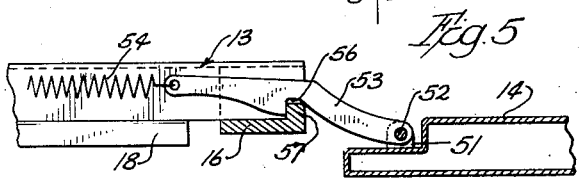
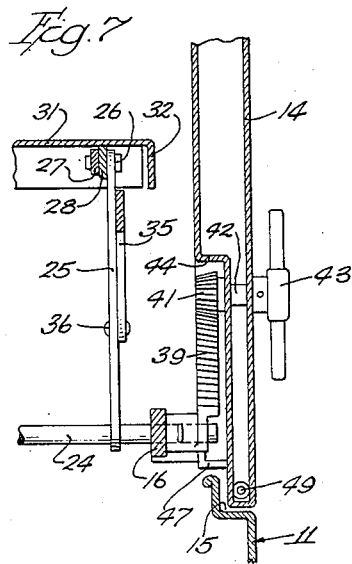
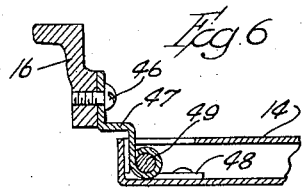
Inventor:
Richard S. Weston
Charles B. Rasmussen
Atty.

Patented June 7, 1938

2,119,898

UNITED STATES PATENT OFFICE 2,119,898

BROILER

Richard S. Weston, Joliet, Ill., assignor to The Moore Corporation, Joliet, Ill., a corporation of Delaware Application April 1, 1935, Serial No. 14,015

2 Claims. (Cl. 126—41)

This invention relates in general to broilers for fluid fuel burning stoves, and has more particular reference to mechanism therein for adjustably varying the distance between the broiler pan and/or the product being cooked and the flame.

Mechanism for such purpose has heretofore been provided, as disclosed in U. S. Letters Patent No. 1,861,689 issued June 7, 1932, but in such prior art devices access to the product being cooked has been had only by withdrawal of the drawer, while still having the actuating means for the pan height adjusting mechanism extend through the front end of the drawer.

A principal object of the present invention is the provision of raising and lowering means for the broiler pan, having actuating or control means therefor extending outwardly through a closure member for the broiler oven, which closure member may be opened without affecting the pan raising and lowering means to give access to the product being cooked without removing the latter from the oven.

Another important object of the invention is the provision in such a broiler of a hinged closure member having novel counterbalancing and movement limiting means, and carrying mechanism for controlling the vertical height of the broiler pan when the member is in closed position.

A further important object of the invention is the provision in such a broiler of mechanism for raising and lowering the pan in any adjusted position even when the control mechanism for said actuating mechanism is disconnected therefrom.

A still further object of the invention is the provision of a single member for opening and closing the broiler oven door, and the drawer (if one be provided), and also for operating the broiler pan raising and lowering mechanism.

Numerous other objects and advantages of the invention will be apparent as it is better understood from the following description, which, taken in connection with the accompanying drawings, discloses a preferred embodiment thereof.

In the drawings,

Fig. 4 is a top plan view of the interior of the broiler compartment with the door open and parts broken away;

Fig. 5 is a detail vertical section taken substantially on the line 5—5 of Fig. 4;

Fig. 6 is a detail sectional view taken substantially on the line 6—6 of Fig. 4; and Fig. 7 is a detail vertical section taken substantially on the line 7—7 of Fig. 2.

Figure 1:
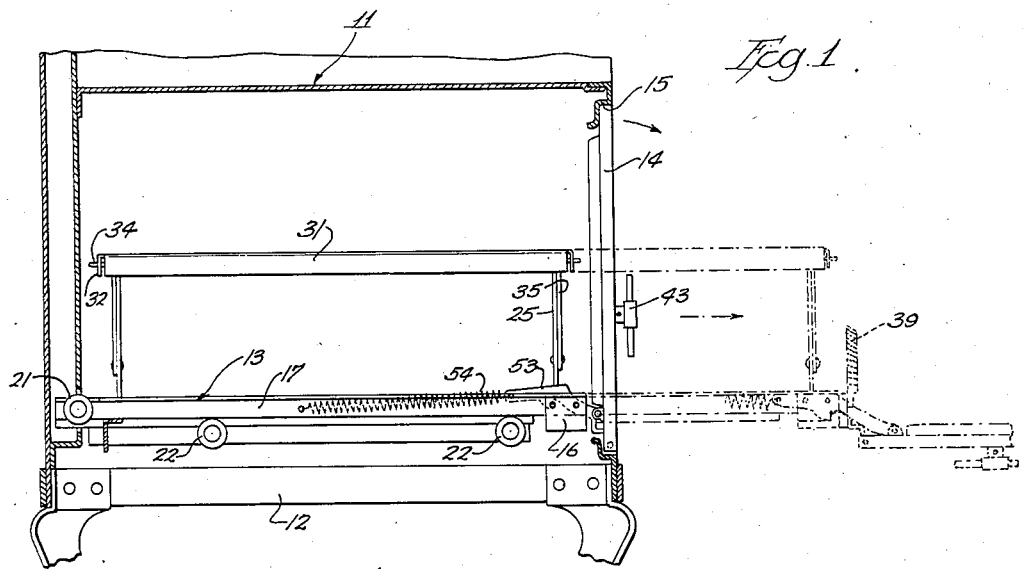
Figure 1 is a transverse section through a broiler embodying the features of my invention, with the drawer shown in partially withdrawn position and the door therefor opened, in dotted lines.

For the purpose of illustrating my invention, I have shown in the drawings a broiler compartment or oven, of any desired or well-known construction, indicated generally at 11, which is or may be supported on a suitable frame 12, and a drawer 13 adapted to be moved into and out of said compartment. A door or closure member 14 is hingedly secured to this drawer in a manner to be later described, and is adapted to fit snugly within a suitable flanged opening in the front wall 15 of the compartment or oven 11. It will be readily apparent that the door 14 may be hinged to the front wall 15 and the drawer per se entirely eliminated by securing the broiler pan raising and lowering mechanism within the oven 11, if such an arrangement is desired.

The drawer 13 comprises a skeleton frame made up of a front member 16, preferably of cast iron, and side and rear members 17, 18 and 19, respectively, rigidly secured in any suitable manner to each other, said side and rear members being preferably stamped from suitable gauge sheet metal.

Rollers 21 may be rotatably mounted upon rearward extensions of the rear frame 19 for engagement in suitable trackways provided at the sides of the compartment 11, and rollers 22 may be provided within the compartment to cooperate with the side frame members 17 and 18 to support the drawer 13 in its movements in and out of the compartment.

Two parallel rods 23 and 24, the ends of which are rotatably supported in any desired manner in the front and rear frame members 16 and 19, respectively, constitute part of the broiler pan raising and lowering mechanism. Each rod 23, 24 is provided adjacent each end with an arm 25 rigidly secured thereto in any suitable manner, and the rearward pair of arms and forward pair of arms are pivotally connected by means of pins 26 with links 27, respectively, at their upper ends.

A pan supporting member 28 is slidably mounted between each of the links 27 and the levers or arms 25 by means of a pair of elongated slots 29 therein co-operating with the pins 26. Supported on the two members 28 is a broiler pan 31 of any desired construction which may be provided with depending marginal flanges 32 at the front and rear ends thereof, having a notch or cut-away portion 33 which is adapted to fit over the outer end of a pin 34, the inner end of which is rigidly secured to the supporting member 28, whereby the pan 31 is prevented from sliding longitudinally relative to the supporting members 28.

Rotatably mounted on each of the pins 34 is one end of a compensating link 35, the other end of each of said links being pivoted at 36 to the right-hand front and rear arm 25, respectively. The links 35 are dimensioned and located to hold the movement of the pan supporting members 28 to a straight vertical line in the raising and lowering thereof through the operation of the parallel motion mechanism comprising the members 23, 24, 25, 26, and 27, the pins 26 sliding in the slots 29 in such movement. A spring 37, secured at one end to the rear pivot pin 36 and at the other end to a suitable stud pin 38 rigidly secured to the rear frame member 19, may be provided to aid in counterbalancing the weight of the pan 31, its associated mechanism, and the product being cooked.

In order to actuate the above described broiler pan raising and lowering mechanism, a segmental bevel gear 39 is rigidly secured to the forward end of the rod 24 immediately in front of the frame member 16, and is adapted to co-operate with and be actuated by a complementally beveled pinion 41 rigidly secured to the inner end of a shaft 42 which is rotatably mounted in the door 14 and has rigidly secured to its outer end a suitable handle 43. The pinion 41 and segment 39 are so beveled to facilitate their meshing together when the door 14 is swung from open to closed position. The door 14, which is of the usual hollow construction, may be provided with a semi-circular depression or recessed portion 44 within which the pinion 41 may be housed and which is adapted to receive the segment 39 when the door is in closed position.

Figure 2:
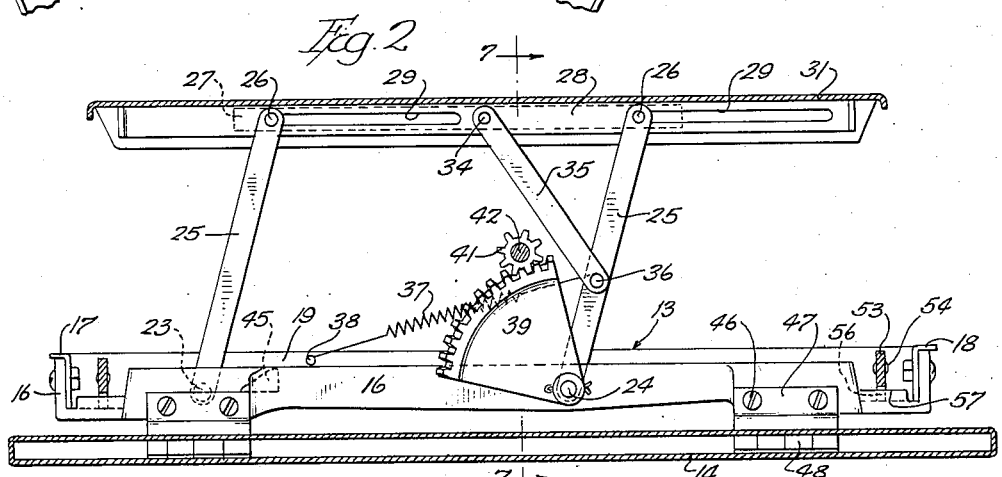
Fig. 2 is a front elevation of the broiler pan and actuating mechanism therefor, parts being shown in section.
Figure 3:
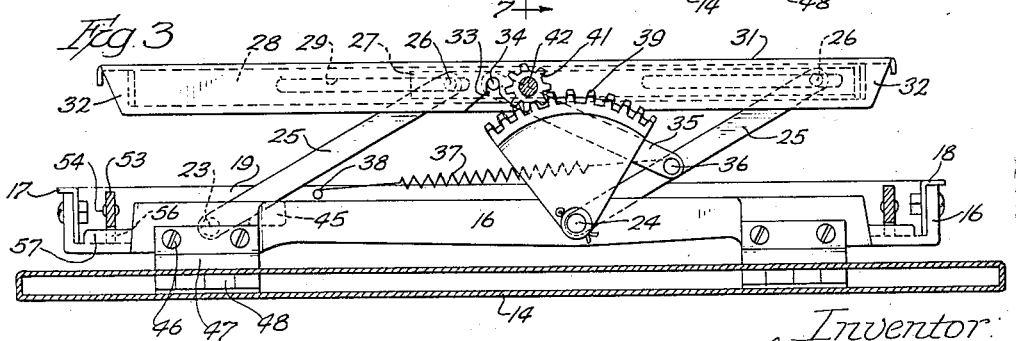
Fig. 3 is a view similar to Fig. 2, showing the pan in lowered position.

The segment 39 is so proportioned and positioned, as will be seen in Figs. 2 and 3, that it is substantially statically balanced relative to the rod 24 when the broiler pan is in its lowermost position. As the pinion 41 is actuated to rotate the segment 39 in a counter-clockwise direction to raise the broiler pan by means of the above described parallel motion linkage, the center of gravity of the segment 39 will be carried to the left of the rod 24 so that the weight of said segment will aid in counterbalancing the weight of the linkage, the broiler pan, and the product to be cooked. By means of this arrangement and the spring 37 the pan 31 will be maintained in any adjusted position even when the pinion 41 is disengaged from the segment 39 when the door 14 is opened.

A stop member or lug 45 is formed integral with the front frame member 16 so as to be contacted by the left-hand front arm 25 to limit the downward movement of the pan 31, as seen in Figs. 3 and 4, and the upward movement thereof will be limited by the pins 26 contacting the left-hand end of the slots 29 (Fig. 2).

Rigidly secured to the front frame member 16, by screws 46, are two hinge plates 47 which, with complemented hinge plates 48 which are secured in any desired manner to the lower part of the door 14, embrace the usual hinge pin 49 to pivotally support said door or closure member.

Suitably secured to the inner wall of the door 14 adjacent the hinges therefor are two pairs of brackets 51 (Figs. 1, 4 and 5), each of which supports a pin or stud 52 upon which is pivotally mounted one end of a lever or stop member 53. The other end of each of the levers 53 is secured to one end of a coil spring 54 which is anchored at its other end to a suitable stud 55 secured to the side frame members 17 and 18, respectively. Intermediate their ends the levers 53 are each provided with a notch 56 forming a vertical shoulder at the back side thereof which is adapted to abut against a lug 57 formed integral with the front frame member 16 when the door 14 is completely open to limit its downward pivotal movement.

The springs 54 function as counterbalancing means for the door 14 as well as tending to close the same when it is in partially open position, and normally maintaining it in closed position. As can be seen from Fig. 5, due to the arrangement of the members 53 and 57 relative to the hinge of the door when the latter is in fully opened position, a toggle-like effect is attained wherein the springs 54 tend to maintain the door in such fully opened position.

It will be apparent that the above described mechanism constitutes a broiler structure in which the closure member may be opened to give access to the product to be cooked without removing the latter from the oven compartment while still permitting vertical adjustment of the broiler pan from the exterior of the compartment when the closure member is closed.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. In a broiler drawer having a broiler pan and mechanism for adjusting the position of said pan relative to said drawer, a segmental gear for actuating said pan adjusting mechanism, a door pivotally secured to said drawer, a pinion mounted on said door so as to engage said segmental gear when said door is in closed position, and means extending exteriorly of said door for actuating said pinion.

2. In a broiler drawer having a broiler pan and mechanism for adjusting the position of said pan relative to said drawer, a segmental gear for actuating said pan adjusting mechanism, a door pivotally secured to said drawer, a pinion mounted on said door so as to engage said segmental gear when said door is in closed position, and means extending exteriorly of said door for actuating said pinion, said segmental gear and said pan adjusting mechanism being so arranged as to maintain said pan in adjusted position even when said door is open.

RICHARD S. WESTON.